July 19, 1966  J. W. SMITH  3,262,038
WINDSHIELD WIPER MECHANISM
Filed Dec. 12, 1962  2 Sheets-Sheet 1
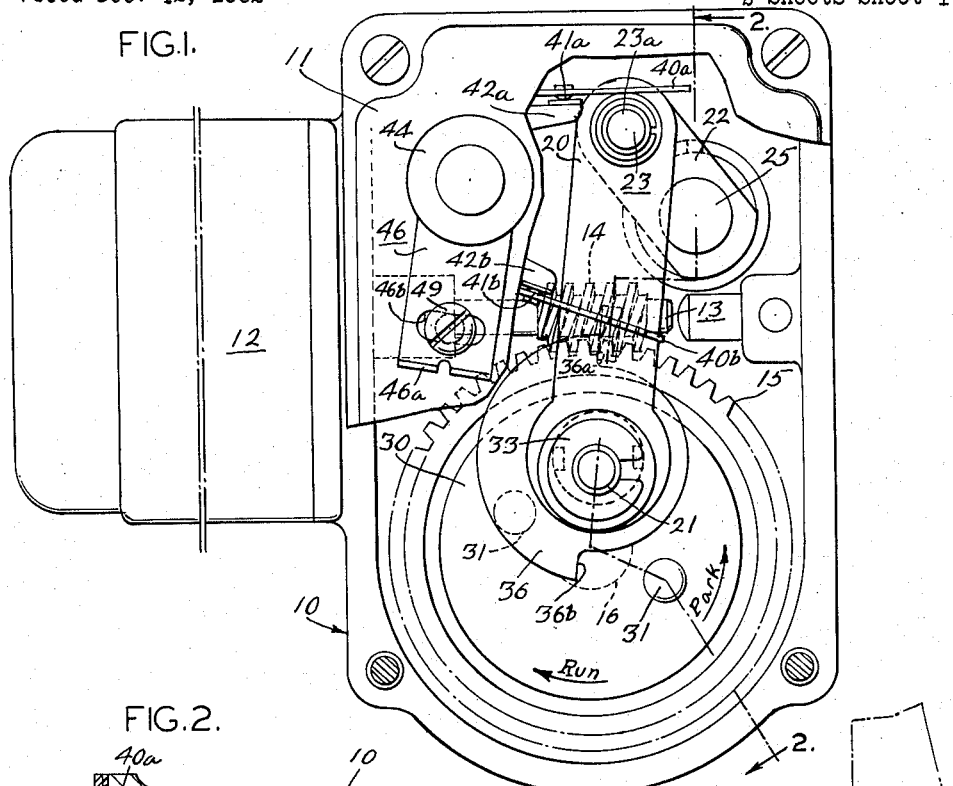
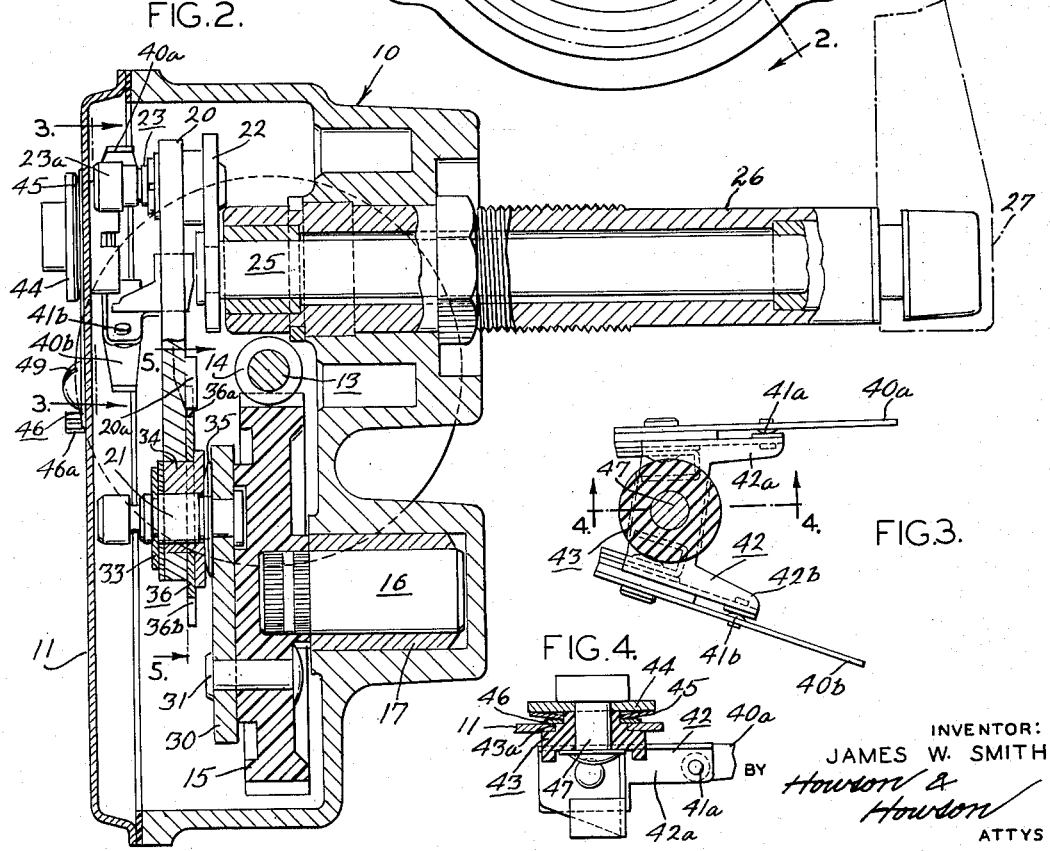
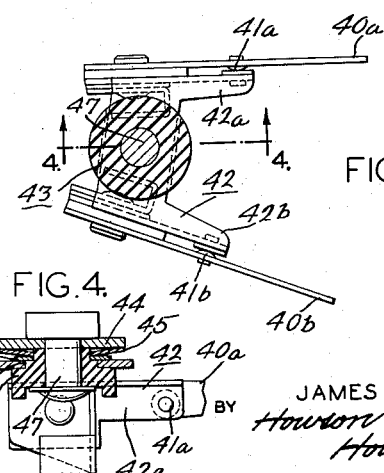
INVENTOR:
JAMES W. SMITH
BY Howson & Howson
ATTYS INVENTOR:
JAMES W. SMITH
BY Howson & Howson
ATTYS

United States Patent Office 3,262,038
Patented July 19, 1966

3,262,038
WINDSHIELD WIPER MECHANISM
James W. Smith, Columbus, Miss., assignor to American Bosch Arma Corporation, Garden City, N.Y., a corporation of New York
Filed Dec. 12, 1962, Ser. No. 244,217
8 Claims. (Cl. 318—265)

The present invention relates to a windshield wiper mechanism and more specifically to such a mechanism which has a depressed parking feature. More specifically, the present invention relates to a number of features which involve linkage connection, parking switch construction and circuitry which make the depressed parking feature possible.

Windshield wiper mechanisms employing automatic parking features whereby a windshield wiper stops at a predetermined position have become almost essential for a commercially saleable structure. Such structures ordinarily employ highly complex linkages which add materially to the cost and complication of structure of the mechanism. Moreover, most of these mechanisms do not provide a depressed parking feature whereby the windshield wiper assumes a position outside the normal arc of the wiper path when in operation.

In accordance with the present invention, a windshield wiper mechanism is provided which permits depressed parking outside of the normal arc of windshield wiper operation. This is accomplished by a simple convenient mechanism employing only very few mechanical linkages and structural changes in a conventional windshield wiper mechanism and employing an improved type of circuit which permits stoppage in a predetermined parking position. Preferably, also the invention includes a parking switch which is adjustable through a range so that precise parking position may be adjusted.

The windshield wiper mechanism of the present invention includes a frame and a rotatable member adapted to be driven in rotational movement about an axis of rotation relative to the frame. Oscillating crank means for driving the windshield wiper are supported on the frame and moveable back and forth through an arc in repetitive oscillatory movement. This oscillatory movement is imparted by an actuating link for translating the rotation of the rotational movement to the oscillatory movement of the crank, and this link is pivotally connected at one end to the crank and at the other end to the rotatable member at a radius from the axis of rotation. The pivotal connection between the link and rotatable member includes means to change the effective radius from the axis of rotation of the pivotal connection. By such an arrangement an actuating member on the link or associated with the crank may actuate a parking switch to open the circuit and stop the motor of the wiper mechanism.

In this connection the preferred circuit in accordance with the present invention includes a direct current motor having a compound wound field. The field is connectable by a manual switch in its operating position in series with the battery to ground. Said manual switch in its off position or parking position connects the series winding at its extreme end to ground like the opposite extreme of the armature and shunt winding. The intermediate point of junction of the series and shunt field windings is connected through a parking switch and another pole of the manual switch to the battery, whereby when the parking switch is opened the flow of current to the motor is interrupted and the mechanism thereafter remains still in parking position.

The parking switch in accordance with the present invention is preferably a switch designed to have two actuator blades between which may be arranged a moveable actuator member. The actuator blades are so arranged that when the actuator member is moved outwardly against either of them its associated switch will be opened. The parking switch is also preferably made adjustable in position by having the switches and switch actuator blades mounted upon a common structure rotatable about a point between the blades and preferably somewhat behind them.

For a better understanding of the present invention reference is made to the following drawings in which:

FIG. 1 is a plan view from the back of the windshield wiper mechanism with the drive motor foreshortened and with part of the casing containing the mechanism broken away;

FIG. 2 is a sectional view taken along lines 2—2 of FIG. 1;

FIG. 3 is a sectional view taken along lines 3—3 of FIG. 2 of a detail showing the parking switch;

FIG. 4 is a partial sectional view taken along lines 4—4 of FIG. 3;

Figure 5:
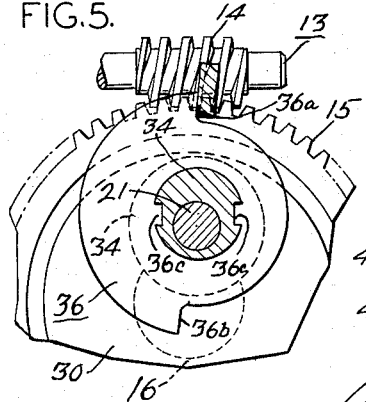
FIG. 5 is a partial sectional view taken along lines 5—5 of FIG. 2.

Referring to FIGS. 1 and 2 in particular it will be seen that the mechanism is housed in a casing generally designated 10 which may be molded or cast in any known appropriate manner. One side of the casing is closed by a sheet metal cover 11 fastened to the casing 10 by screws or other suitable connection means. A suitable drive motor 12, ordinarily a direct current motor is provided and in this case it is preferably a direct current motor capable of reversing its direction of rotation.

As is conventional in systems of this type, the motor shaft 13 is provided with a helical worm 14 which meshes with a larger worm gear 15, here supported on an integral shaft 16 suitably journaled in a bearing 17 within a preformed portion of the housing 10. The gear 15 drives a link 20 conventionally through a suitable pivot stud 21 located off center on the gear 15 but having an axis parallel to the axis of the worm gear. In this case a special connection is provided between the stud 21 and the link 20 but in other respects the arrangement is conventional. The link 20 is connected at its remote end to a crank arm 22 by means of a suitable pin or pivot connection 23 having a parking switch actuator extension 23a. Crank arm 22 is fastened to rotate with shaft 25 which is suitably journaled in bearings in a conventional sleeve 26 provided in an extension of the housing 10 for this purpose. The wiper blade assembly 27 is connected to the end of shaft 25. The geometry of this arrangement is such that, as the motor drives worm gear 15 through worm 14, link 20 will be moved by stud 21 to cause crank arm 22 to oscillate back and forth through an arc of predetermined size. This action preferably accounts for the full oscillation of the windshield wiper blade once each revolution of the gear 15.

In accordance with the present invention it is desired to provide a depressed park position for the wiper blade when not in use such that it will be positioned beyond one terminal or the other of its normal arc by a predetermined distance and remain in that position thereafter until the mechanism is again placed in operation.

To achieve the desired result in accordance with the present invention departures from the prior art are made in at least three separate respects and preferably with all three in combination, although each has separate advantages of its own which may make it useful in other combinations.

One of these features is a mechanical structure which enables a different parking arc having at least one terminal boundary extending beyond the terminal boundary of the normal operating arc. The other terminal boundary may be short of the normal operating boundary. This is preferably achieved in accordance with the present invention by a special eccentric bearing arrangement between the gear 15 or other suitable rotatable member, or more specifically stud 21, and the link 20.

Another novel feature is the provision of a parking switch which stops the motor when a terminal parking position has been reached. Preferably the switch arrangement is such that it enables selection of the terminal position within limits and may even enable selection of a terminal position at one extreme or the other of the arc.

Finally the present invention provides a novel motor circuit whereby the motor may be easily reversed by a simple switching arrangement and then automatically shut off by the parking switch.

First, considering the eccentric bearing arrangement, it will be observed that the stud 21 is mounted to rotate with a plate 30 which is supported on the rotatable member 15 by means of suitable rivets 31 or like means. The eccentric bearing 34 is placed on the stud 21 between the plate 30 and a retaining ring 33 with a bowed washer 35 serving as a spring means to transmit rotational movement from gear 15 to the eccentric bearing 34 to hold it in place and yet permit slippage between the bearing and the rotatable member when bearing 34 is held against rotation. The nature of the eccentric bearing can best be seen in the cross sectional view of FIG. 2 which shows the eccentric bearing 34 journaled within the link 20. The link and the eccentric bearing are, of course, rotatable relative to one another. The washer 36 as seen in FIGS. 1 and 2 is fixed to the eccentric bearing 34 or the stud 21 to rotate with the bearing relative to gear 15. This is accomplished by virtue of ears 36c on the washer (see FIG. 5) which engage within keyways on the eccentric bearing 34. Washer 36 has a distinctive shape with shoulders 180 degrees apart separating portions of different radius. These shoulders, 36a and 36b alternatively engage opposite sides of lug 20a on link 20.

Figure 6:
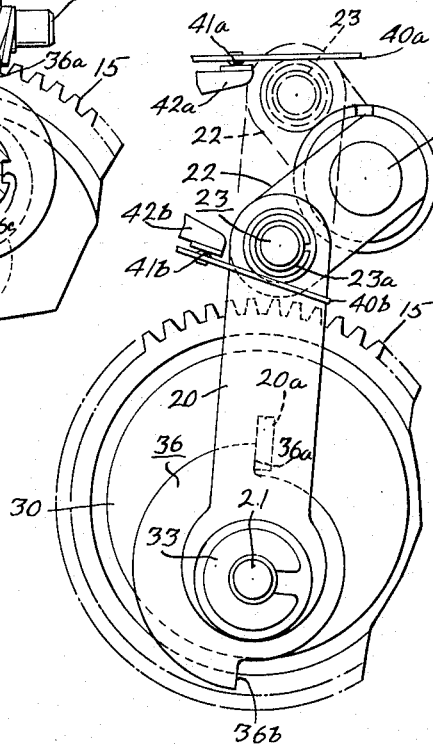
FIG. 6 is a plan view showing part of the mechanism in extreme positions assumed in the course of rotation of the rotatable member in one direction.
Figure 7:
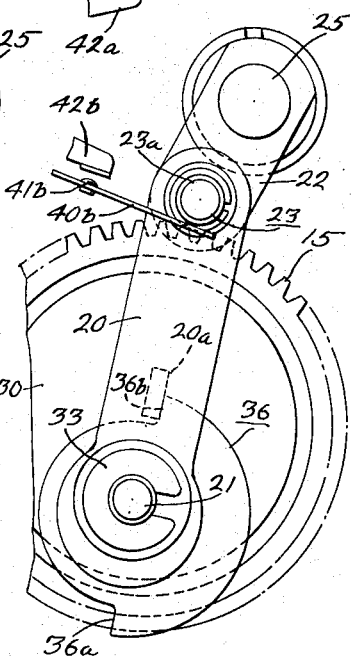
FIG. 7 is a view similar to that of FIG. 6 showing the mechanism in the other extreme position when the motor operates in the opposite direction.
Figure 8:
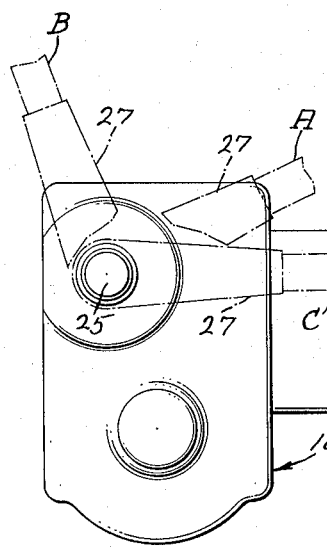
FIG. 8 is a plan view showing the various positions of the windshield wiper relative to the wiper mechanism.

Preferably the arrangement is such that for normal operation the rotation of gear 15 as viewed in FIG. 1 will be clockwise, as indicated by the arrow marked "run," for normal operation. It will be understood that rotation of gear 15 in this direction will cause the eccentric bearing 34 and the washer 36 to likewise rotate in a clockwise direction as viewed in FIG. 1 until shoulder 36a strikes lug 20a and thereafter to remain in that position since the washer 36 permits slippage therebetween as long as rotation continues in the clockwise direction. Slight movement is tolerated by this arrangement with the eccentric bearing affixed in the position determined by the engagement of shoulder 36a against lug 20a on link 20 as shown in FIGS. 1, 5, and 6. Link 20 will have essentially a fixed radius of rotation relative to gear 15 with the bearing in this position. On the other hand if the direction of the motor is reversed, thereby reversing the direction of rotatable member 15, shoulder 36b will be driven against the opposite side of lug 20a on link 20 as seen in FIG. 7 thereby effectively moving the radius of eccentric bearing 34 inwardly relative to gear 15. This will have the effect of shortening and displacing the arc of the windshield wiper and cause the wiper to swing past its normal terminal position at one extreme of its arc. The effects of change in radius are shown by comparison of FIGS. 6 and 7. Such comparison shows the change of the terminal end in the arc described by the actuator pin extension 23a between the link 20 and the crank arm 22. Changes in the position of wiper 27 are shown in FIG. 8 wherein positions A and B represent opposite extremes of the arc described by the wiper in normal run operation and position C represents its parking position. It can be seen from FIG. 7 that the pin actuator 23a moving through the normal arc in run position may be confined between certain limits which prevent it from striking resilient actuator blades 40a and 40b of limit switches 41a and 41b. The limit switches are preferably mounted on a moveable support structure 42 which has a pair of contact support arms 42a and 42b. The support 42 serves as an electrical connection between the switches 41a and 41b and thereby connects them in series.

The means of supporting the support 43 for the switches relative to the cover 11 of the casing 10 is seen in FIGS. 1 and 4.

The detailed mechanical structure of the parking switch may be seen in FIGS. 3 and 4. The metallic support structure 42 is preferably sheet metal bent in the manner shown. This support is, in turn, molded into or otherwise affixed to an insulator member of phenolic resin or other suitable material serving as a bearing member. This bearing member is provided with a reduced diameter shoulder 43a which is snugly fitted within an opening in the sheet metal casing cover 11 from the inside surface thereof. Bearing member 43 is fixed to a complementary insulating member 44 between which the cover 11, washer 45 and an adjustment lever 46 are located, and holding the assembly of insulating member 43 and 44 together is a rivet 47. The adjustment lever 46 is preferably formed to fit or keyed to molded insulator bearing member 43. Adjustment lever 46 extends parallel to the casing cover 11 and terminates in an outward extending flange 46a in which is provided a screwdriver slot (see FIG. 1) for rotational adjustment of the position of adjustment lever 46. A lateral slot 46b accommodates a screw 49 fixed in cover 11 which, when loosened, permits the adjustment lever 46 in the direction of the slot 46b.

It will be apparent that by adjustment of the member 46 through the slot in flange 46a the insulator members 44 and 42 are readjusted in position and thereby move the deck 42 and the switches supported thereon to a new position rotatable about the axis of rotation of the structure through the rivet 46. Clockwise rotation as viewed in FIG. 1 will move both actuator blades 40a and 40b downward and this, for example, might affect the parking position somewhat by making the point at which the switch 41b is opened a little bit later and, therefore the wiper parking position a little bit lower. It might even have the effect of completely removing blade 40b for switch 41b and substituting blade 40a for switch 41a in the path of the actuator extension 23a of pin 23, for example. The reverse, of course, is true in the event the structure is moved counter-clockwise.

Figure 9:
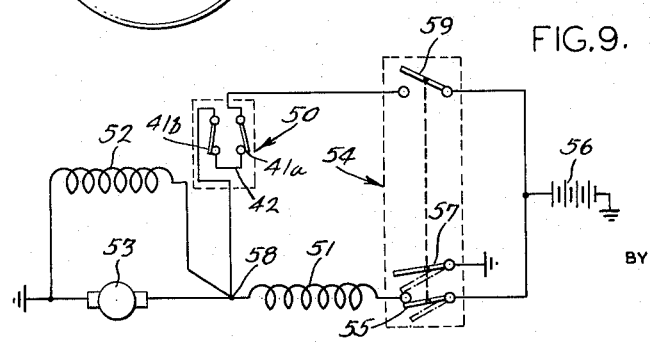
FIG. 9 is a circuit diagram showing a preferred circuit for the drive motor of the present invention.

The preferred circuit for the system and operation of the system is seen in FIG. 9. In this circuit the parking switch, generally designated 50, is shown to be connected to the junction point 58 between the series winding 51 and the parallel winding 52 of a compound wound direct current motor which has an armature 53 in parallel with winding 52. The circuit arrangement is such that the manual switch 54 has a normally open pole 55 which, when closed in the full line position shown, energizes the motor by connecting it in its normal series arrangement to the power source 56. In this position the parking switch plays no part in the operation and the motor operates continuously as a compound wound direct current motor. However, when switch 54 is turned to its "off" position, series winding 51 which was connected to the direct current power source is then connected to ground through pole 57. Junction point 58 is connected through the parking switch 50 and pole 59 of switch 54 to the battery 56. The other end of parallel winding 52 and armature 53 remains connected to ground. This has the effect of maintaining current in the same direction in parallel winding 52 but reversing the direction of current flow in series winding 51 which, however, is thereby placed in parallel with the armature and the parallel winding across the power source. Since the series winding carries more current than the parallel winding, the series winding is made dominant, and the motor reverses its direction and moves slowly in reverse. The reversal of direction causes the change in position of eccentric bearing 34 in the manner previously described in connection with FIGS. 6 and 7. This reversal changes the effective radius of the pivot connection between rotatable member 15 and link 20 which, in turn, changes the arc of crank 22 and wiper arm 27. Thus, the pin extension 23a is able to reach an actuator blade, and specifically blade 40b in the situation shown in FIG. 7. One pair of contacts of the parking switch will be opened by the actuator and the circuit to the motor will be thereby interrupted so that the wipers will not be able to move further. Interruption occurs because switches 41a and 41b are in series due to common support and connection member 42 described previously. The wiper will thus park in position C.

It will be clear that the ground and battery connections selected in the circuit of FIG. 9 can be inter-changed. Other changes in the circuit and the mechanical structure not specifically described will be obvious to those skilled in the art. All such modifications within the scope of the claims are intended to be within the scope and spirit of the present invention.

I claim:

1. A windshield wiper mechanism comprising a frame for containing said mechanism, a rotatable member adapted to be coupled to and driven by a motor in rotational movement about an axis of rotation relative to the frame, oscillating crank means supported on the frame for driving a windshield wiper back and forth through an arc by means of repetitive oscillatory movement, an actuating link for translating the rotation of the rotatable member into the oscillatory movement of the crank, said link being pivotally connected at one end to the crank and at the other end to the rotatable member at a radius from the axis of rotation, a parking switch supported by the frame including a pair of switch contacts connectable to the motor, actuator means for opening the contacts of the parking switch to deenergize the motor, said parking switch being rotatable relative to the actuator means to change the point at which the actuator means opens the parking switch, said pivotal connection between the link and the rotatable member including means to change the effective radius from the axis of rotation of the pivotal connection for inducing movement of the actuator means to open the contacts thereby deenergizing the motor.

2. The mechanism of claim 1 in which the means to change the effective radius from the axis of the rotation of the pivotal connection between the link and the rotatable member includes a generally cylindrical eccentric bearing rotatably supported on a pin on the rotatable member off the cylindrical axis of the bearing member but parallel thereto, said bearing member being journaled in said link, means to hold the bearing member in alternative selected positions relative to the axis of the pin, and means to change the rotational position of the bearing member with respect to the axis of the pin thereby to effectively change the axis of the pivotal connection between the rotatable member and the link.

3. The mechanism of claim 2 in which the means to hold the bearing in position relative to the pin is self-positioning in response to rotation of the rotatable member to assume and maintain one position in response to rotation in one direction and another position in response to rotation in the other direction.

4. The mechanism of claim 3 in which the means to hold the bearing in position is an element rotatable relative to the axis of the pin and is provided with shoulders respectively opposed to shoulders provided by the actuating link, said element being integral to rotate with the bearing so that its rotation in one direction will permit rotation of the bearing only until one opposed pair of shoulders is in contact and so that the rotation in the other direction will permit rotation of the bearing only until the other opposed pair of shoulders is in contact.

5. The mechanism of claim 4 in which the means to hold the bearing in place is a washer fixed to rotate with the bearing and having a pair of shoulders oppositely disposed to the shoulders provided by the link.

6. The mechanism of claim 5 in which the washer has ears fitting within grooves on the bearing and the shoulders on the link are both provided by a single lug one side of which is opposed to one shoulder and the other side of which is opposed to the other shoulder of the washer.

7. The mechanism of claim 3 in which the rotatable member is driven by a compound wound direct current motor having field windings in series and in shunt with its armature, in which said parking switch is connected to the junction between the field windings and in which a manual switch is provided alternately to connect the motor field windings in series across a power supply or in parallel across the power supply and in series with the parking switch, the series winding being dominant such that when the motor windings are connected in parallel the motor reverses direction.

8. The mechanism of claim 7 in which the parking switch is adjustable in position relative to the crank arm and the link to change the exact parking position, the parking switch being actuated open at a point determined by the relative movement of said link.

References Cited by the Examiner

UNITED STATES PATENTS

| | | | |
|---|---|---|---|
| 1,370,073 | 2/1921 | Utz et al. | 287—53 |
| 2,317,070 | 4/1943 | LeTourneau | 287—53 |
| 2,452,966 | 11/1948 | Thomas | 318—297 |
| 2,531,719 | 11/1950 | Alvino | 318—296 |
| 2,735,058 | 2/1956 | Pasculle | 318—297 |
| 2,753,721 | 7/1956 | Latta | 74—600 X |
| 2,959,968 | 11/1960 | Gute | 74—70 |
| 2,960,580 | 11/1960 | Aquillon | 200—6 |
| 3,012,110 | 12/1961 | Price | 200—6 |
| 3,045,165 | 7/1962 | Littwin | 318—286 |
| 3,085,781 | 4/1963 | La Pointe | 251—134 X |
| 3,090,068 | 5/1963 | Brooks | 15—250.17 |
| 3,095,597 | 7/1963 | Woldron | 15—250.17 |
| 3,127,549 | 3/1964 | Smith | 318—298 |

MILTON O. HIRSHFIELD, *Primary Examiner.*

ORIS L. RADER, *Examiner.*

S. GORDON, D. F. DUGGAN, *Assistant Examiners.*